No. 724,053. PATENTED MAR. 31, 1903.
R. F. SCHROEDER.
OIL BURNER.
APPLICATION FILED SEPT. 28, 1901.
NO MODEL.
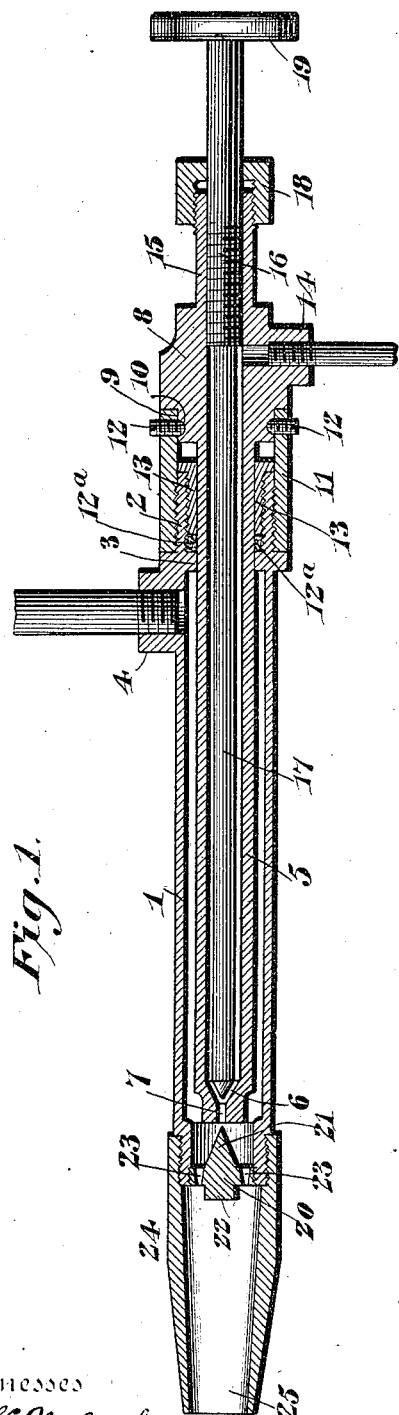
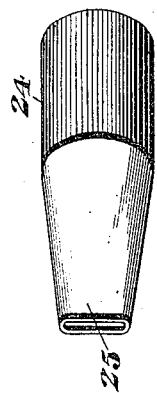
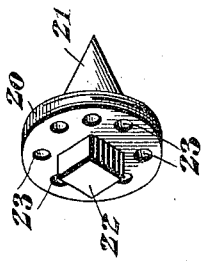
R. F. Schroeder, Inventor

UNITED STATES PATENT OFFICE.

RICHARD FRANKLIN SCHROEDER, OF SACRAMENTO, CALIFORNIA.

OIL-BURNER.

SPECIFICATION forming part of Letters Patent No. 724,053, dated March 31, 1903.

Application filed September 28, 1901. Serial No. 76,913. (No model.)

*To all whom it may concern:*

Be it known that I, RICHARD FRANKLIN SCHROEDER, a citizen of the United States, residing at Sacramento, in the county of Sacramento and State of California, have invented a new and useful Oil-Burner, of which the following is a specification.

This invention relates to oil-burners, and has for its object to effect a thorough and efficient mixing of oil and steam in a simple and inexpensive manner prior to the point of ignition and also to provide for conveniently controlling the supply of oil and for adjusting the mixing device so as to insure a proper intermingling of the steam and oil.

It is furthermore designed to insure a quick and unobstructed escape of the combined steam and oil in the form of a spray after they have become mixed, and especially to obviate any dead steam-space.

Another object resides in the provision of an adjustable connection between the inner and outer shells, so as to permit of a tightening of the joint without rotating either of the shells.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is a central longitudinal sectional view of an oil-burner constructed and arranged in accordance with the present invention. Fig. 2 is a detail perspective view of the mixing device. Fig. 3 is a detail perspective view of the burner-tip.

Like characters of reference designate corresponding parts in all the figures of the drawings.

Referring to the accompanying drawings, 1 designates an open-ended tubular casing or external shell, which is internally and externally screw-threaded at its outer end and also provided at its opposite end with a reduced longitudinally-projected cylindrical flange 2, which is externally and internally screw-threaded, there being an inner annular flange 3 located at the inner end of the cylindrical flange. A lateral externally-projected and internally-screw-threaded nipple 4 is provided adjacent to the inner end of the shell or casing and communicates with the interior thereof, so as to form a steam-inlet for connection with a suitable source of steam.

Within the outer shell or casing is an inner shell or tube 5, which is inserted through the inner end of the outer casing and is terminated short of the outer or forward end thereof. The forward end of this oil-tube is provided with a reduced or conical-shaped socket 6, forming a valve-seat, from which a comparatively small port 7 opens outwardly through the end of the tube. The rear end of the oil-tube is provided with an enlarged head portion 8, the forward end of which is reduced by means of a circular rabbet 9, the back of which is provided with a marginal groove 10.

To effect the connection between the inner end of the outer shell and the head of the inner shell, there is provided a sleeve or tubular coupling 11, which is swiveled to the head by having one end rotatably received within the groove or rabbet 9 and provided with two or more set-screws 12, piercing the coupling and slidably engaging the groove 10, so as to permit of rotation of the coupling, the opposite end of the latter being internally screw-threaded to fit the external screw-threaded portion of the flange 2 or adjacent end of the outer shell.

After the inner tube and the head portion 8 have been properly fitted to the external tube or casing 1 the set-crews 12 are set snugly against the head 8, so as to prevent accidental turning thereof, and thereby effectually interlock the inner and outer tubes or shells.

Should it be desirable to withdraw the inner tube, this may be done without interfering with any of the other parts of the burner by withdrawing the set-screws 12 entirely from the groove 10 in the head 8, whereby the inner tube is free to be moved outwardly.

It will here be observed that in assembling the inner and outer shells the inner tube is inserted inwardly through the inner end of the outer shell and through the guide-opening formed by the marginal flange 3 until the coupling-sleeve 11 engages the screw-threaded cylindrical flange 2, after which the sleeve is rotated to draw the two members together without requiring rotation of either member. In order that a tight joint may be effected between the parts, a gasket or packing-ring 12ª is first inserted in the cylindrical flange 2 and against the shoulder formed by the inner marginal flange 3, and a metallic gland 13 is then screwed into the cylindrical flange, so as to hold the packing-ring tightly in place and snugly against the inner tube or shell.

The outer end portion of the head 8 is provided with a lateral and internally-screw-threaded nipple 14, which is in communication with the interior of the member and is designed for connection with an oil-supply. An internally-screw-threaded casing or cylindrical extension 15 is provided in longitudinal alinement with the bore of the inner tube and receives the screw-threaded stem portion 16 of a needle-valve 17, the inner pointed end of which is designed to control the outlet-port 7 of the inner oil-tube. A suitable stuffing-box 18 is applied to the outer end of the extension or casing, and a hand-wheel 19 is carried by the outer end of the valve-stem, whereby the latter may be conveniently controlled.

From the foregoing description it is apparent that the oil is fed through the inner tube and the steam is fed through the annular space surrounding the oil-tube and between the latter and the outer shell, and therefore it becomes necessary to thoroughly mix the steam and the oil before the latter is ignited, and to accomplish this result there is provided a mixing device in the form of a flat disk 20, which is externally screw-threaded and is fitted into the outer or forward end of the outer shell to form a closure therefor and is provided at its inner side with a central conical stud or projection 21, the apex of which normally lies at or adjacent to the outer end of the oil-tube, so as to form a spreader or deflector for the oil as it escapes from the tube. The outer face of this disk is provided with a polygonal projection 22, which is designed to form a wrench seat or head whereby the device may be conveniently applied and removed and also adjusted to vary the distance between the conical deflector and the discharge end of the oil-tube. A plurality of perforations 23 are formed through the disk and are located in a marginal series surrounding the conical projection and are tapered outwardly, the inner ends of the openings occupying substantially the space between the base of the conical projection and the inner wall of the outer shell, so that there may be no projections to interfere with the free escape of the mixed steam and oil, and thereby to obviate any dead steam-space. Furthermore, this tapered shape of the openings produces jets, so as to spray or atomize the discharged fluid.

It will here be noted that the space bounded by the projected forward end of the outer tube or shell and between the forward end of the inner tube or shell 5 and the disk 20 forms a mixing-chamber which embraces the oil-spreading device 21, wherefore it is apparent that the oil and the steam are thoroughly mixed before they pass through the perforations 23 in the disk which closes the outer end of the mixing-chamber, and ignition of the fuel does not take place until it has passed to a considerable distance beyond the mixing-chamber—that is to say, at the outer end of the nozzle 24. Moreover, the nozzle 24 is entirely separate from the mixer 20, and therefore may be adjusted independently of each other, the nozzle embracing the exterior of the outer shell or casing and the mixer being fitted to the interior of said shell or casing.

A tubular burner-tip 24 is fitted to the externally-screw-threaded forward end of the outer shell and has an outer flattened conical terminal 25 to produce a narrow slit-like discharge-opening, which results in a fan-like discharge of the fluid where the latter is ignited and is formed into a flame.

From the foregoing description it is apparent that the present device embodies but comparatively few parts, which are compactly assembled and may be conveniently removed for purposes of cleansing and replacement should any of the parts become damaged. Moreover, by reason of the improved mixing device the oil and steam are effectually intermingled in a simple and economic manner, so as to insure an intense flame at the outer end of the burner-tip. The mixing device may also be adjusted toward and away from the oil-tube, so as to accommodate for all conditions of the burner, and the means for controlling the supply of oil is entirely independent of the mixing device, so that neither of these parts depends in any manner upon the other.

What I claim is—

1. A burner of the character described having an outer steam-tube, an inner oil-tube having its discharge end terminated short of the corresponding end of the outer tube, the space within the projected end of the outer tube and between the forward ends of the tubes forming a mixing-chamber, and an oil-spreading device having an adjustable screw-threaded connection with the projected end portion of the outer tube, and provided with an inner conical deflector located within the mixing-chamber in coöperative relation to the adjacent end of the inner tube.

2. In an oil-burner, the combination with inner and outer tubes or shells, the forward end of the inner tube being terminated short of the forward end of the outer tube, and the space within the projected end of the outer tube and between the forward ends of the two tubes forming a mixing-chamber, of a spreading device closing the outer end of the mixing-chamber with a portion projected into said chamber and adjustable toward and away from the point of discharge of the inner tube, and a nozzle carried by the outer tube independently of the spreading device and also projected outwardly beyond the latter.

3. In an oil-burner, the combination with inner and outer tubes or shells, the forward end of the inner tube being terminated short of the forward end of the outer tube, and the space within the outer tube and between the forward ends of the two tubes forming a mixing-chamber, of a spreading device mounted within the projected end of the outer tube and closing the outer end of the mixing-chamber with a portion projected into said chamber and adjustable toward and away from the point of discharge of the inner tube, and a nozzle extended from the outer tube and independent of the spreading device.

4. In an oil-burner, the combination of an inner oil-tube, an outer steam-tube projected beyond the inner tube, the space bounded by the projected end of the outer tube and between the forward ends of the two tubes forming a mixing-chamber, an oil-spreading device fitted to the inner walls of the outer projected end portion of the outer tube and closing the same, said oil-spreading device having perforations for the escape of the fuel and an oil-spreading projection which is embraced by the mixing-chamber, the spreading device being adjustable in the mixing-chamber toward and away from the discharge end of the inner oil-tube, and a nozzle which is independent of the spreading device and is carried by the exterior of the projected end of the outer tube.

5. A burner of the character described, having an outer steam-tube, an inner oil-tube having its discharge end terminated short of the corresponding end of the outer tube, the space between the ends of the two tubes forming a mixing-chamber, and an oil-spreading device consisting of a disk adjustably screwed into the discharge end of the outer tube and provided upon its inner side with a conical spreading projection located within the mixing-chamber, a wrench-seat upon its outer side, and a plurality of perforations formed through the disk and surrounding the base of the conical projection.

6. In an oil-burner, the combination of an inner oil-tube having a controlling-valve, an external steam-tube surrounding the same, a mixing-chamber in communication with the discharge ends of the two tubes, and a spreading device comprising a disk located within the mixing-chamber and adjacent to and externally of the discharge end of the inner tube and adjustably screwed into the discharge end of the outer tube to permit of adjustment of the mixer toward and away from the oil-tube, and a conical projection carried by the inner face of the disk and extended toward and disposed concentrically with respect to the discharge end of the oil-tube, the disk also being provided with perforations surrounding the base of the projection and tapered outwardly.

7. As a new article of manufacture, a spreading device for oil-burners, comprising a disk having an externally-screw-threaded peripheral edge, a reduced central conical-shaped projection on one side of the disk, a reduced polygonal wrench projection on the opposite side of the disk, and perforations surrounding the base of the conical projection and tapered toward the wrench projection side of the disk.

8. A burner of the character described comprising inner and outer tubes spaced apart to provide an intervening passage, the inner tube being projected beyond the outer tube and having an external annular groove in its projected portion, the adjacent end of the outer tube being externally screw-threaded, a packing embracing the inner tube and interposed between the same and the outer tube, a gland embracing the inner tube and extending between the same and the outer tube and engaging the packing, an interiorly-threaded sleeve embracing the grooved portion of the inner tube and engaging the threaded portion of the outer tube, and an adjustable fastening device piercing the sleeve and engaging the groove, substantially as described.

9. A burner of the character described comprising inner and outer tubes spaced apart to provide an intervening passage, the inner tube being projected beyond the outer tube and having an external annular groove in its projected portion, the adjacent end of the outer tube being externally and internally screw-threaded and provided with an inner annular flange, packing embracing the inner tube and lying against the flange, a gland interposed between the inner and outer tubes and engaging the packing and provided with external screw-threads to engage the internally-screw-threaded portion of the outer tube, an interiorly-threaded sleeve embracing the grooved portion of the inner tube and engaging the external screw-threads of the outer tube, and an endwise-adjustable fastening device piercing the sleeve and engaging the groove, substantially as and for the purpose described.

10. An oil-burner having inner and outer tubes, of which the forward end of the outer tube is projected beyond the forward end of the inner tube and the rear end of the inner tube is projected beyond the rear end of the outer tube, the space within the forward end of the outer tube and between the forward ends of the two tubes forming a mixing-chamber, an oil-spreading device within the mixing-chamber, and a coupling-sleeve swiveled upon the rear end of one of the tubes and having a detachable screw-threaded connection with the rear end of the other tube.

In testimony that I claim the foregoing as my own I have hereto affixed my signature in the presence of two witnesses.

RICHARD FRANKLIN SCHROEDER.

Witnesses:
M. A. GETT,
M. D. COFFMAN.